(12) United States Patent
Lee et al.

(10) Patent No.: US 9,793,727 B2
(45) Date of Patent: Oct. 17, 2017

(54) APPARATUS FOR WIRELESS CHARGING

(71) Applicant: SAMSUNG ELECTRO-MECHANICS CO., LTD., Suwon-si (KR)

(72) Inventors: Sang Beom Lee, Suwon-si (KR); Seung Won Park, Suwon-si (KR); Yong Woon Park, Suwon-si (KR); Sang Ho Cho, Suwon-si (KR); Jae Hyoung Cho, Suwon-si (KR); Chang Ik Kim, Suwon-si (KR)

(73) Assignee: Samsung-Electro-Mechanics Co., Ltd., Suwon-si (KR)

( * ) Notice: Subject to any disclaimer, the term of this patent is extended or adjusted under 35 U.S.C. 154(b) by 113 days.

(21) Appl. No.: 14/878,301

(22) Filed: Oct. 8, 2015

(65) Prior Publication Data
US 2016/0105048 A1    Apr. 14, 2016

(30) Foreign Application Priority Data

Oct. 10, 2014 (KR) .................. 10-2014-0136561
Feb. 25, 2015 (KR) .................. 10-2015-0026237

(51) Int. Cl.
*H01M 10/46* (2006.01)
*H02J 7/00* (2006.01)
(Continued)

(52) U.S. Cl.
CPC ............. *H02J 7/0044* (2013.01); *F16M 3/00* (2013.01); *H02J 7/025* (2013.01); *H02J 7/04* (2013.01)

(58) Field of Classification Search
CPC .......... H02J 7/355; H02J 7/0042; H02J 7/025; H02J 5/005
(Continued)

(56) References Cited

U.S. PATENT DOCUMENTS 7,750,508 B2   7/2010  Kato et al.
8,204,541 B2   6/2012  Fuji et al.
(Continued)

FOREIGN PATENT DOCUMENTS

CN    101364748 A    2/2009
CN    101809976 A    8/2010
(Continued)

OTHER PUBLICATIONS

Extended European Search Report dated Feb. 9, 2016 in counterpart European Application No. 15189084.5 (8 pages in English).
Korean Office Action dated Nov. 17, 2015 in counterpart Korean Application No. 10-2015-0026237 (11 pages in Korean with English translation).
(Continued)

*Primary Examiner* — Edward Tso
(74) *Attorney, Agent, or Firm* — NSIP Law

(57) ABSTRACT

A wireless charger optimized for charging efficiency of portable terminals (e.g., mobile phones) of different sizes has a housing including within it laterally spaced side supports and a bottom support for cradling an inserted portable terminal. The side supports and the bottom support are interlocked for coordinated movement such that the bottom support is moved by a predetermined amount according to movements of the side supports. This arrangement optimizes relative placement of the charger's transmitting coil and the portable terminal's receiving coil.

25 Claims, 19 Drawing Sheets

(51) Int. Cl.
*F16M 3/00* (2006.01)
*H02J 7/02* (2016.01)
*H02J 7/04* (2006.01)

(58) Field of Classification Search
USPC .................................. 320/107, 108, 114, 115
See application file for complete search history.

(56) References Cited

U.S. PATENT DOCUMENTS

| | | | |
|---|---|---|---|
| 9,148,033 B2 | 9/2015 | Van Wiemeersch | |
| 2004/0090773 A1* | 5/2004 | Bryan | A45C 3/08 362/156 |
| 2008/0296979 A1* | 12/2008 | Kato | H02J 7/0044 307/104 |
| 2010/0081473 A1 | 4/2010 | Chatterjee et al. | |
| 2010/0173674 A1 | 7/2010 | Fujii et al. | |
| 2013/0088193 A1 | 4/2013 | Chen | |
| 2014/0176057 A1 | 6/2014 | Van Wiemeersch | |

FOREIGN PATENT DOCUMENTS

| | | |
|---|---|---|
| CN | 102420466 A | 4/2012 |
| CN | 203734330 U | 7/2014 |
| DE | 10 2004 044 089 A1 | 4/2006 |
| DE | 20 2013 105 754 U1 | 4/2014 |
| EP | 1 998 423 A2 | 12/2008 |
| JP | 2005-110475 A | 4/2005 |
| KR | 2002-0082597 A | 10/2002 |
| KR | 10-2014-0089972 A | 7/2014 |
| KR | 10-1425211 B1 | 7/2014 |
| KR | 10-2014-0095918 A | 8/2014 |
| KR | 10-2014-0114613 A | 9/2014 |
| WO | WO 2012/099965 A2 | 7/2012 |
| WO | WO 2012/099965 A3 | 7/2012 |

OTHER PUBLICATIONS

Chinese Office Action dated Jul. 3, 2017, in corresponding Chinese Patent Application No. 201510654325.6 (14 pages in English, 9 pages in Chinese).

* cited by examiner

APPARATUS FOR WIRELESS CHARGING

CROSS-REFERENCE TO RELATED APPLICATIONS

This application claims the benefit under 35 USC 119(a) of Korean Patent Application Nos. 10-2014-0136561 and 10-2015-0026237 filed on Oct. 10, 2014 and Feb. 25, 2015, respectively, in the Korean Intellectual Property Office, the entire disclosures of which are incorporated herein by reference for all purposes.

BACKGROUND

1. Field

The following description relates to a wireless battery charger.

2. Description of Related Art

A wireless charger is an apparatus capable of charging a battery without a direct physical connection to the battery's electrical contacts, and typically includes a terminal body around which a power-transmitting coil is wound. To receive power from the charger, the battery includes or is connected to a wireless power receiver, which has a power-receiving coil that can interface with the charger's power-transmitting coil. Batteries of this type are used in, for example, portable terminals, such as mobile phones, and other portable battery-powered devices.

The charging efficiency of such a wireless charging arrangement usually is optimized when the battery's power-receiving coil is placed on or adjacent to the terminal body so as to be in close proximity to a central portion of the power-transmitting coil, thus minimizing battery charging time. Wireless chargers of the related art typically have a structure onto which the battery is simply placed but lack structure for aligning the battery's power-receiving coil with the central portion of the power-transmitting coil, thus often compromising charging efficiency of the battery. The lack of uniformity in case sizes of portable terminals, such as mobile phones, makes this a fairly widespread problem.

Further, such wireless chargers are often maintained in a stand-by mode, which wastes energy. In this mode, a power source remains connected to and powers the wireless charger to sense the approach of a portable terminal to be charged, thus unnecessarily consuming power.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A general aspect of the disclosed examples provides a wireless charger that optimizes charging efficiency in the charging of portable terminals (mobile phones, or the like) of various sizes. In general, such a wireless charger includes a housing with an insertion hole through which a portable terminal can be inserted, and a transmitting coil in the housing disposed to face a receiving coil of an inserted portable terminal. A pair of laterally spaced side supports in the housing are disposed to move laterally toward and away from each other on opposite sides of an inserted portable terminal, while a bottom support in the housing is disposed to move lengthwise of the housing and support a portion of the bottom of an inserted portable terminal. The side supports are mechanically linked to the bottom support such that movement of the bottom support is coordinated with movement of the side supports.

The upper end of one or both side supports may be inclined (tapered) to facilitate insertion of a portable terminal into the housing.

One or more elastic members may be interposed between the housing and any one or more of the side and bottom supports to provide a return force for the supports after the portable terminal is removed from the housing.

According to another aspect, the bottom support may comprise two separate bottom support portions, each connected to a separate side support to form two support assemblies; and movement of each support assembly may be guided by a guide protrusion slidably engaged with a guide rail inclined with respect to the side supports and the bottom support.

Each support assembly may be L-shaped.

The gradient of the guide rail may substantially correspond to an aspect ratio of an insertable portable terminal.

According to yet another aspect, a power transfer unit including gears coordinates movement of the bottom support and at least one of the side supports.

The power transfer unit may have a first gear that meshes with teeth on the bottom of a side support and is rotated by lateral movement of the side support; and a second gear that meshes with the first gear and with teeth on the bottom support to move the bottom support lengthwise of the housing.

Still another aspect provides a wireless charger having improved efficiency by preventing the consumption of standby power before beginning a charging process. According to this aspect, which also includes movable side supports and a bottom support for an inserted portable terminal, a switch between the charger and a power source is controlled by movement of one of the side supports or the bottom support.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
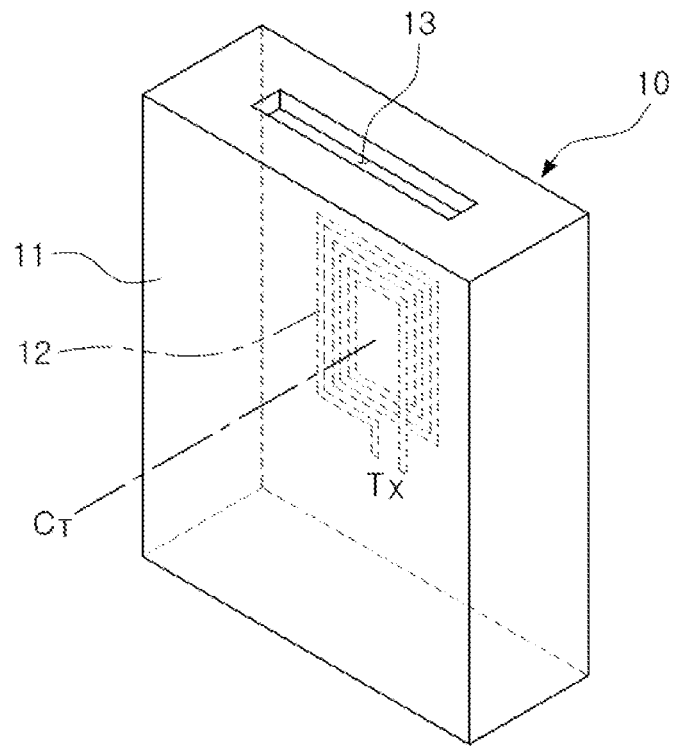
FIG. 1A is a perspective view of a generalized housing of embodiments of the wireless chargers showing the general position of a power-transmitting coil therein.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to persons skilled in the art. Sequences of operations described herein are merely examples, and are not limited to those set forth herein, but may be changed as will be apparent to persons skilled in the art, with the exception of operations necessarily occurring in a certain order. Also, descriptions of functions and constructions that are well known to persons skilled in the art may have been omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to persons skilled in the art.

Words describing spatial relationships, such as "below," "beneath," "under," "lower," "bottom," "above," "over," "upper," "top," "left," "right," "side" and "lateral," may be used to conveniently describe relationships of one device or elements with other devices or elements. Such words are to be interpreted as encompassing a device oriented as illustrated in the drawings, and in other orientations in use or operation.

Figure 1B:
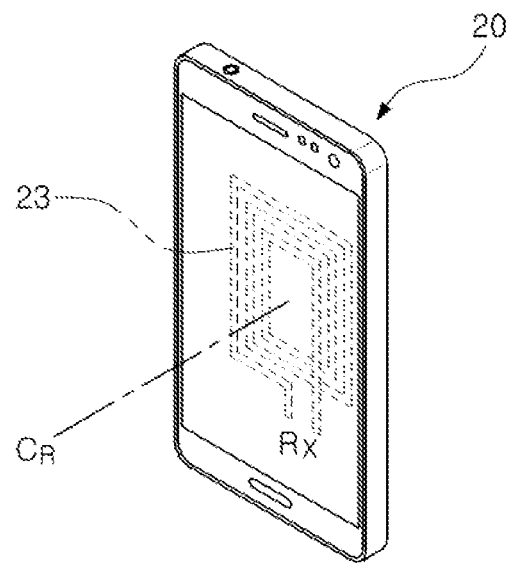
FIG. 1B is a perspective view of a typical portable terminal (mobile phone) usable with the wireless charger, showing the general position of its power-receiving coil.

Referring to FIGS. 1A and 1B, a wireless charger 10 may include a housing 11 having a top insertion hole 13 through which a mobile phone or other type of portable terminal 20 may be inserted; and a transmitting coil 12 in the housing disposed to face a receiving coil 23 of the portable terminal 20 when inserted in the housing 11.

Figure 2:
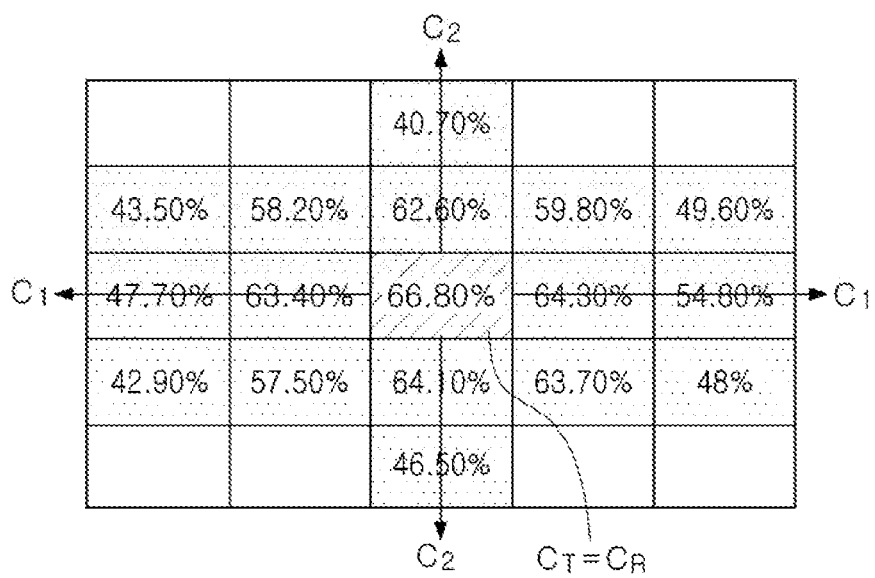
FIG. 2 is a diagram illustrating receiving coil charging efficiency as a function of relative position of centers of the transmitting coil and the receiving coil of the wireless charger and a portable terminal, respectively.

FIG. 2 demonstrates that charging efficiency is reduced as a function of the degree to which the center $C_R$ of the receiving coil 23 is offset from the center $C_T$ of the transmitting coil 12 in the horizontal ($C_1$) direction and/or the vertical ($C_2$) direction. The best charging efficiency (66.80%) is achieved when the center $C_T$ of the transmitting coil 12 and the center $C_R$ of the receiving coil 23 are aligned with each other. Thus, optimal charging efficiency is achieved when the center $C_T$ of the transmitting coil 12 and the center $C_R$ of the receiving coil 23 are aligned with each other or are in close proximity to each other.

Figure 3:
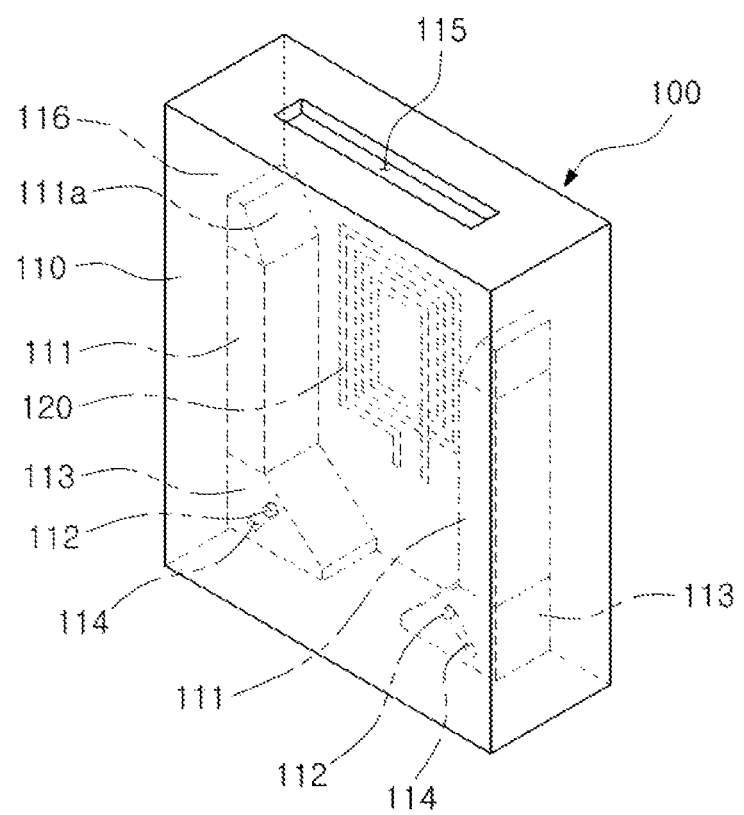
FIG. 3 is a perspective view of a first example of the wireless charger.
Figure 4:
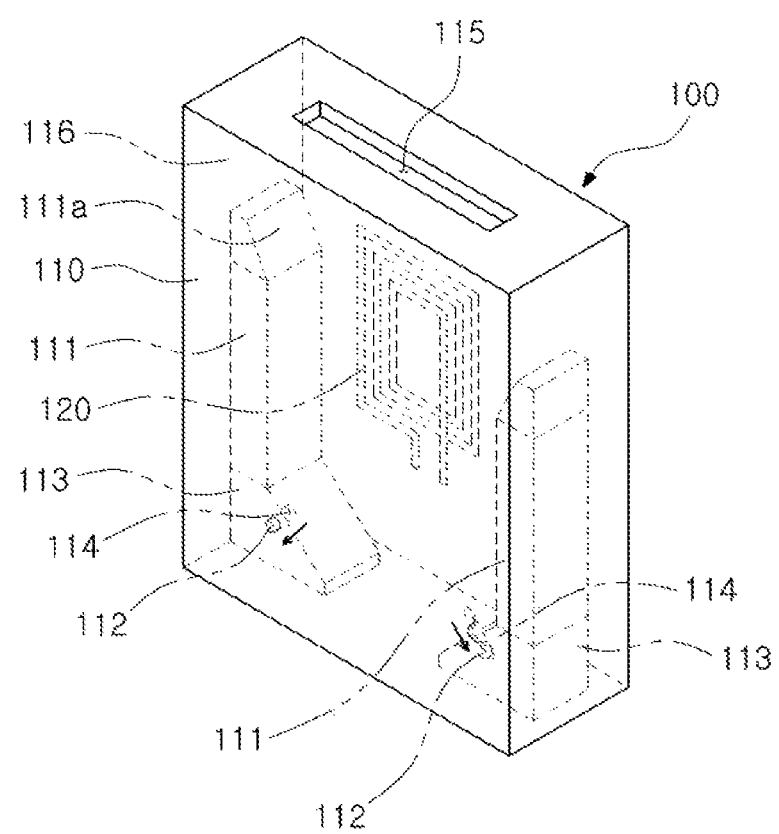
FIG. 4 is a perspective view similar to FIG. 3 showing certain parts of that example in different positions.

Referring to FIGS. 3 and 4, a wireless charger 100 according to a first example has a housing 110 including an insertion hole 115 through which an electronic device such as a portable terminal or the like can be inserted into the housing. A transmitting coil 120 is disposed to face the receiving coil of the portable terminal when inserted into the housing. The housing 110 includes upright side supports 111 spaced to engage the sides of the portable terminal and a bottom support comprising bottom support portions 113 positioned to support the bottom of the portable terminal. These supports 111, 113 thus cradle the portable terminal, preferably elastically. See elastic members (compression springs) 111c, 113c in FIGS. 5A, 5B (described below).

The side supports 111 and the bottom support portions 113 preferably are interlocked as described below such that the bottom support portions 113 are moved by a predetermined amount according to movement of the side supports 111, preferably at a predetermined ratio. In other words, lengthwise movement of the bottom support portions 113 is a function of lateral movement of the side supports 111. That movement occurs when a portable terminal wider than the space between the side supports in a non-deflected state is inserted into or removed from the housing 110.

Figure 5A:
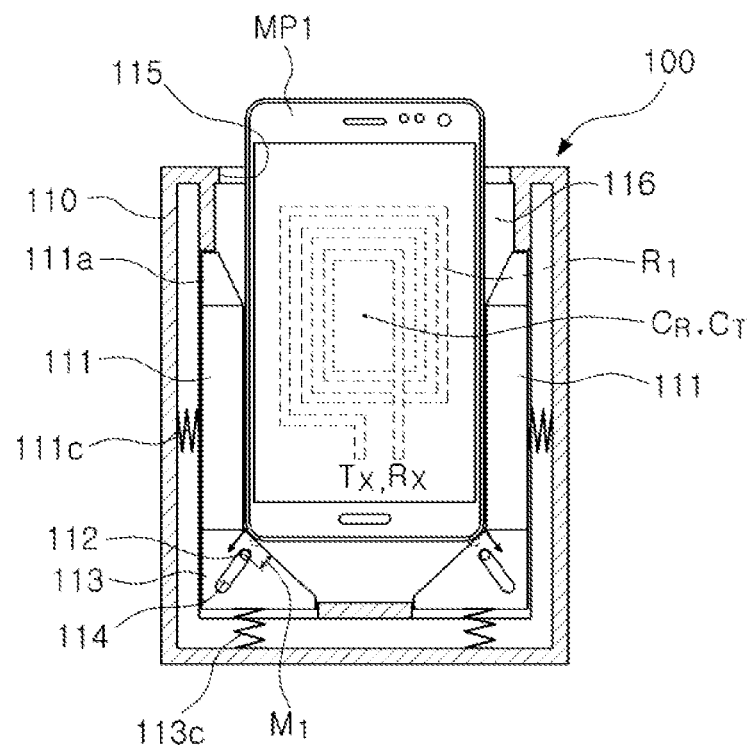
FIG. 5A is a cross-sectional view of the first example cradling a mobile phone for charging.
Figure 5B:
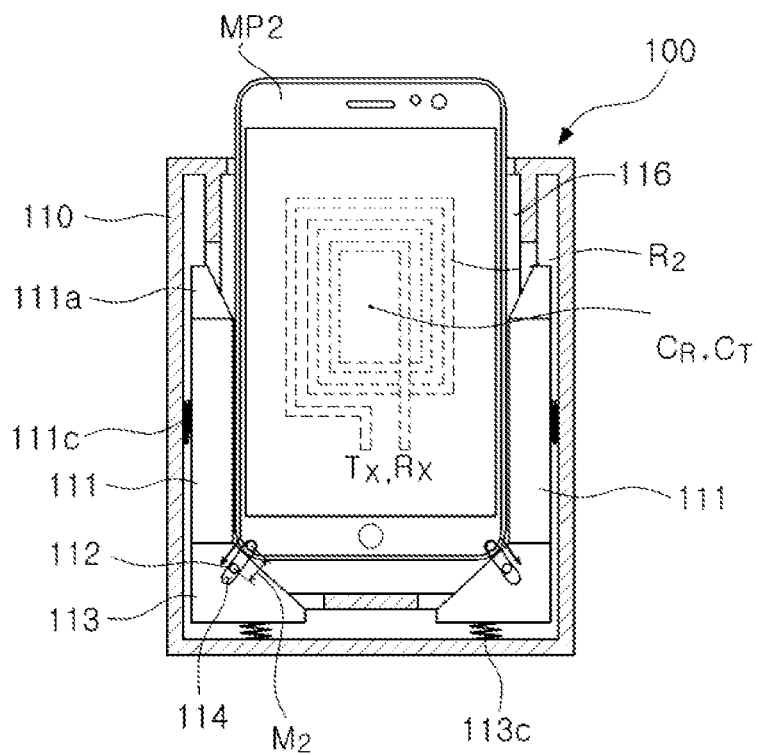
FIG. 5B is a cross-sectional view of the first example cradling a larger mobile phone for charging.

As shown in FIGS. 5A and 5B, portable terminals (mobile phones), for example, MP1, MP2, come in various sizes. With the transmitting coil 120 fixed and laterally centered in the charger housing 110, substantially equal movement of the side supports 111 optimally keeps the centrally positioned receiving coil ($R_X$, $R_1$, $R_2$) of the inserted portable terminal laterally centered in the housing, and thus laterally centered on the transmitting coil 120 ($T_X$) regardless of the terminal's size. Even if those two coils ($T_X$, $R_X$) are not precisely centered lengthwise, optimal lengthwise alignment of their centers ($C_T$, $C_R$) is achieved because the aspect ratios of phones of different sizes (length to width) generally fall within a narrow range, and the side supports 111 and the bottom support portions 113 move proportionally due to their interlocked arrangement (described below).

In this first example, each of the bottom support portions 113 is in the form of an inclined, inward extension of its respective side support 111, thus resulting in an interlocked structure such that the bottom support portion 113 is moved downward or returned according to lateral movement of its side support 111. The side supports 111 may be elastically supported, thus elastically cradling the sides of an inserted portable terminal and resulting in a stable structure.

Although FIGS. 3, 4, 5A and 5B illustrate the housing 110 as having a box-like shape, the housing 110 may have various shapes according to desired style or applications. The insertion hole 115 leads to a cavity 116 in the housing that may have the general shape of the portable terminals to be charged and may have a size sufficient to accommodate and cradle portable terminals such as MP1 and MP2 as shown, or larger portable terminals. The cavity 116 may be as long as the portable terminals to be cradled in the housing 110. For example, a cavity formed in the housing 110, having a shape in which one surface of the housing 110 is opened to cradle the portable terminal, or the like, may be used.

The housing 110 may include guide rails 114 that are inclined with respect to the side supports 111 and the bottom support portions 113 as described below. Each of the guide rails 114 (one at each side) may be disposed adjacent to a side support 111 and its respective bottom support portion 113. Further, the gradient of the guide rails 114 may be determined as substantially corresponding to the aspect ratio (length:width) of the portable terminals (e.g., MP1 and MP2) to be cradled.

The side supports 111 and the bottom support portions 113 may protrude into the cavity 116 as shown in FIGS. 5A and 5B. A side support 111 and a bottom support portion 113 may be provided. The side supports 111 may be firm or elastically deformable. Depending on the size of a portable terminal inserted into cavity 116, the side supports 111 may undergo lateral sliding movement, and may squeeze the sides of the portable terminal. The upper end of one or both side supports 111, i.e., the end portion which a portable terminal first encounters when inserted, may have a tapered part 111a inclined laterally outward and upward to facilitate insertion of a portable terminal and/or outward movement of the side support(s) 111.

The bottom support portions 113 may be firm or elastically deformable and/or may undergo sliding movement; and they may press on the lower corners of a portable terminal inserted into the cavity 116. As shown in FIGS. 3-5B, each of the side supports 111 is connected to a respective bottom support portion 113 to form an L-shaped assembly having a guide protrusion 112 disposed adjacent to a respective guide rail 114. Guide protrusion 112 may extend from any portion of the assembly and is engaged in the guide rail 114. The guide protrusions 112 may be elastically coupled to their respective guide rails 114 and may be mounted so as to be returned to original positions after a portable terminal is removed from the charger.

When a portable terminal (e.g, MP1 or MP2) displaces the side supports 111 outward during insertion into the cavity 116, each guide protrusion 112 is moved downward and laterally outward along a respective guide rail 114 as the side supports 111 are spread apart, and the bottom support portions 113 are lowered to accommodate most of the length of the portable terminal in the cavity. As a result, the center $C_T$ of the transmitting coil 120 disposed in the housing 110 and the center $C_R$ of the receiving coil 120, which is aligned with the center of the portable terminal, are substantially aligned with each other or are in close proximity to each other, thus optimizing charging efficiency.

Since each of the side supports 111 is connected to a bottom support portion 113, thus forming a substantially integral or interlocked assembly, a restoring force applied to any part of each such assembly will provide a common restoring force for the entire assembly. For example, a restoring force may be provided by a first elastic member 111c located between the side support 111 and the housing 110. Alternatively or in addition, a second elastic member 113c may be provided between the bottom support portion 113 and the housing 110. Thus, only any one of the first elastic member 111c and the second elastic member 113c may be provided, or both may be provided.

The illustrated first example of FIGS. 3-5B has a guide protrusion 112 on either the side support 111 or the bottom support portion 113, and the guide rail 114 is carried by the housing 110. Alternatively, the guide protrusion may be carried by the housing 110 and the guide rail may be carried by the side support 111 or the bottom support portion 113.

FIGS. 5A and 5B show that a wireless charger 100 according to this first example may be flexibly used depending on the sizes of the portable terminals to be charged. FIG. 5A illustrates a case in which a first portable terminal MP1 having a relatively small size is inserted into the wireless charger 100. It can be seen from FIG. 5A that movements of the side supports 111 and the bottom support portions 113 are relatively small (M1). By comparison, FIG. 5B illustrates a case in which a second portable terminal MP2 having a relatively large size is inserted into the wireless charger 100. It can be seen from FIG. 5B that movements of the side supports 111 and the bottom support portions 113 are relatively large (M2). Since movements of the side supports 111 and the bottom support portions 113 are interlocked with each other, it can be seen in either case ($MP_1$, $MP_2$) that the center $C_T$ of the transmitting coil $T_X$ (120) and the center $C_R$ of the receiving coil $R_X$, which is located at the center of the portable terminals MP1 and MP2, are substantially aligned with each other or are in close proximity to each other.

Figure 6:
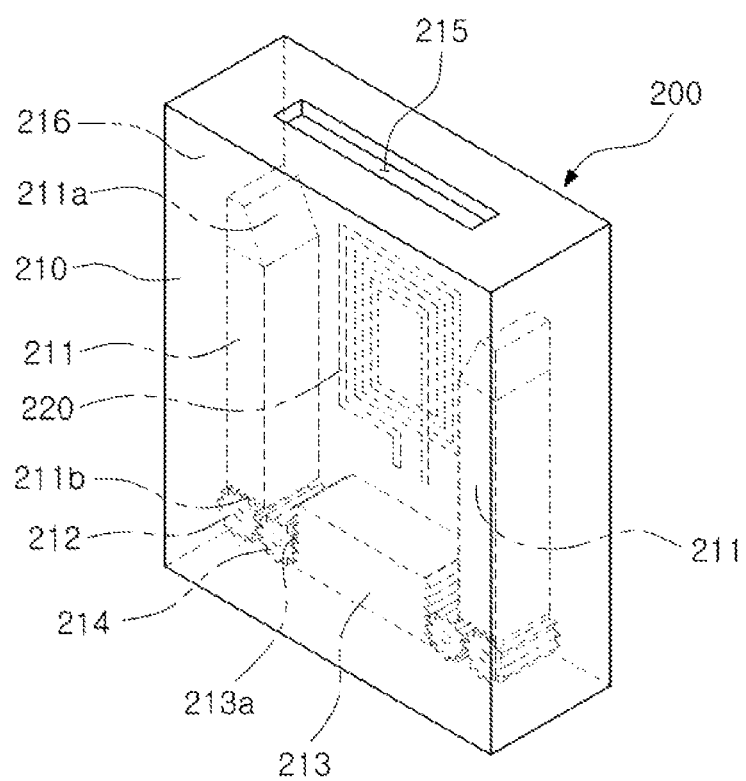
FIG. 6 is a perspective view of a second example of the wireless charger according to a second example.
Figure 7:
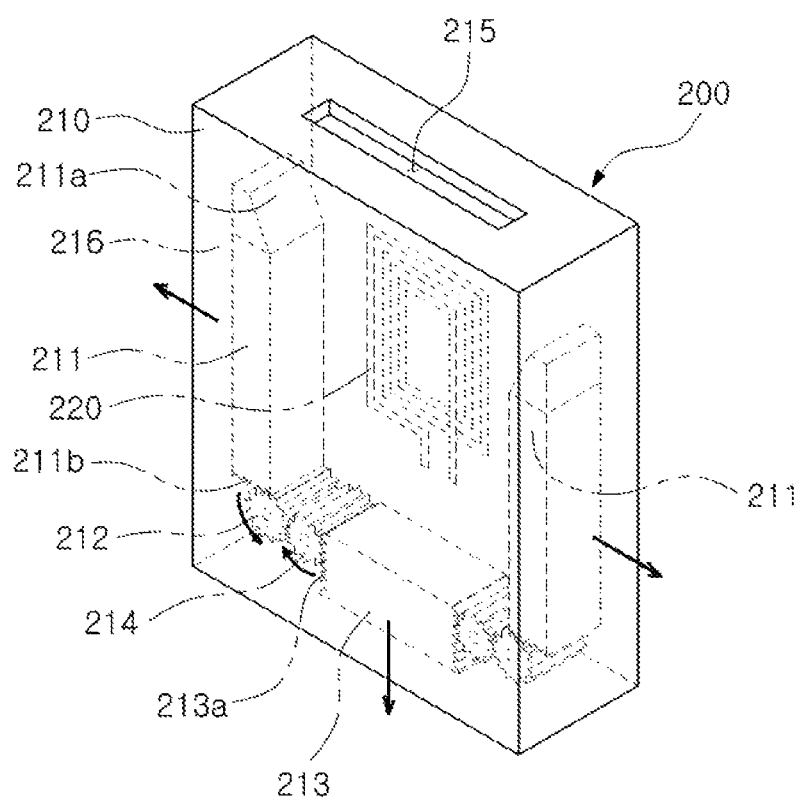
FIG. 7 is a perspective view similar to FIG. 6 showing certain parts of that example in different positions.

Referring to FIGS. 6 and 7, a wireless charger 200 according to a second example has some features in common with the first example but a different arrangement for coordinating movement of the side and bottom supports for an inserted portable terminal. This example has a housing 210 including an insertion hole 215 through which a portable terminal may be inserted; and a transmitting coil 220 disposed to face the receiving coil of a portable terminal inserted into the housing. The housing 210 may include side supports 211 spaced to engage the sides of the portable terminal and a bottom support 213 positioned to support the bottom of the portable terminal. These supports 211, 213 thus cradle the portable terminal, preferably elastically. See elastic members (compression springs) 211c, 213c in FIGS. 8A, 8B.

The side supports 211 and the bottom support 213 may be interlocked by gears 212 and 214, which rotate in fixed positions in the housing, such that the bottom support 213 is moved by a predetermined amount according to movement of the side supports 211, i.e., at a fixed ratio. In this example, the gears 212 and 214 may be saw-toothed wheels (pinions). As in the first example, in the wireless charger 200 according to this second example, regardless of the sizes of the portable terminals MP1 and MP2 (see FIGS. 8A, 8B), the center $C_T$ of the transmitting coil 220 and the center $C_R$ of the receiving coil ($R_1$, $R_2$, etc.) are aligned with each other or are in close proximity to each other, thereby optimizing charging efficiency. That is because, as explained previously, the charger's transmitting coil and the phones' receiving coils are laterally centered; the aspect ratios of phones of different sizes generally fall within a narrow range; and the side and bottom phone supports within the charger's housing move proportionally. In this embodiment, too, the side supports 211 may be elastically supported, thus elastically cradling the sides of an inserted portable terminal and resulting in a stable structure.

Although FIGS. 6, 7, 8A and 8B illustrate the housing 210 as having a box-like shape, the housing 210 may have various shapes according to desired style or applications. The insertion hole 215 leads to a cavity 216 in the housing that may have the general shape of the portable terminals to be charged and may have a size sufficient to accommodate portable terminals such as MP1 and MP2 as shown, or larger portable terminals. The cavity 216 may be as long as the portable terminals to be cradled in the housing 210. For example, a cavity provided in the housing 210 having a shape in which one surface of the housing 210 is opened to cradle the portable terminal, or the like may be used.

Figure 8A:
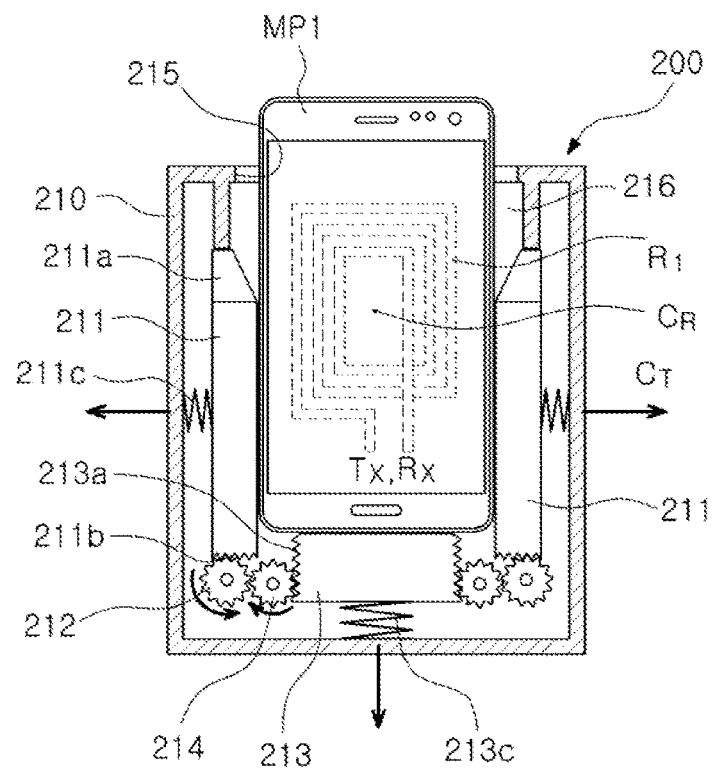
FIG. 8A is a cross-sectional view of the second example cradling a mobile phone for charging.
Figure 8B:
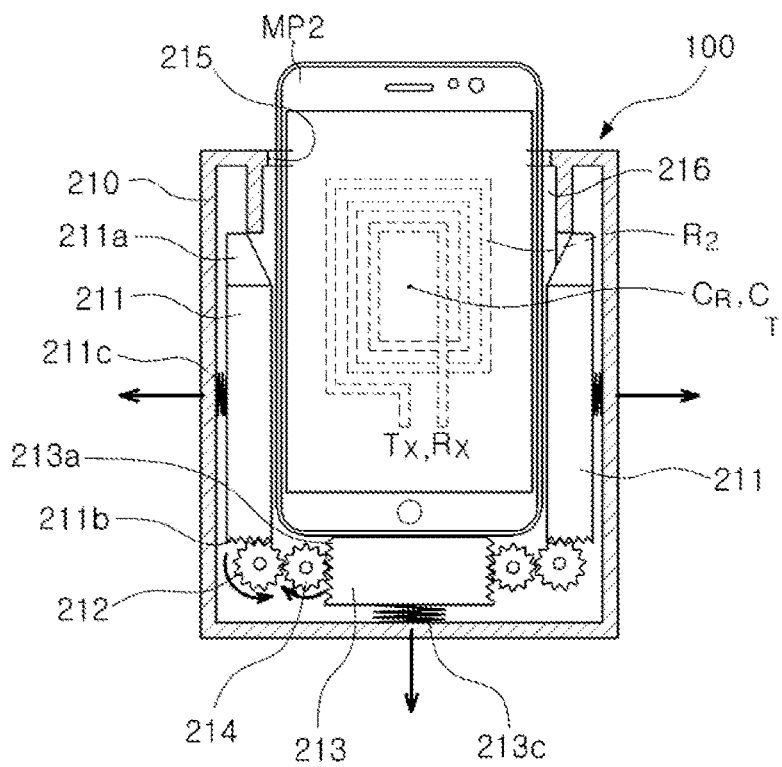
FIG. 8B is a cross-sectional view of the second example cradling a larger mobile phone for charging.

The side supports 211 and the bottom support 213 may protrude into the cavity 216 as shown in FIGS. 8A and 8B. The side supports 211 and the bottom support 213 are interlocked with each other by gears 212 and 214, such as the saw-toothed wheels shown and described below. In addition, a pair of side support portions 211 may be provided, and one of the bottom support portions 213 may be connected to all of the side support portions 211 on both sides, or a pair of bottom support portions 213 may be respectively connected to the side support portions 211 on both sides.

The side supports 211 of this example may be firm or elastically deformable. Depending on the size of a portable terminal inserted into cavity 216, the side supports 211 may undergo lateral sliding movement, and may squeeze the sides of the portable terminal. The upper end of one or both side supports 211, i.e., the end portion which a portable terminal first encounters when inserted, may have a tapered part 211a inclined laterally outward and upward to facilitate insertion of a portable terminal and/or outward movement of the side supports 211.

The bottom support 213 may be firm or elastically deformable and may press on a bottom portion of a portable terminal inserted into the cavity 216. Further, the bottom support 213, which is connected to (interlocked with) the side supports 211 by the gears 212 and 214, moves together with the side supports 211 in mutual fashion. In other words, the bottom support 213 is downwardly moved by outward movement of the side supports 211, and vice versa, as explained below.

As illustrated on the left sides of FIGS. 6, 7, 8A and 8B, a first gear 212 of a saw-toothed wheel and a second gear 214 of a saw-toothed wheel are engaged with each other. The first gear 212 also is engaged with a first sawtooth rack 211b provided in the bottom of the side support 211 and the second gear 214 is engaged with a second sawtooth rack 213a provided in the end of the bottom support 213. Thus, when the first rack 211b moves laterally outward (as a portable terminal is inserted into the housing), the first gear 212 is rotated in a counterclockwise direction. Thereby, the second gear 214 is rotated in a clockwise direction and the bottom support 213 engaged with the second gear 214 is moved downward. FIGS. 6, 7, 8A and 8B show a mirror-image arrangement of these gears and racks at the right side of the charger. The movement ratio of the side support 211 and the bottom support 213 depends on the number of saw teeth of the first gear 212 and the second gear 214, and may be determined by taking account of the aspect ratios (widths and lengths) of the portable terminals MP1 and MP2. Alternative arrangements may include, for example, more than two gears on each side between the side supports 211 and the bottom support 213.

When a portable terminal is inserted into the housing 210, the center $C_T$ of the transmitting coil 220 in the housing 210 and the center $C_R$ of the receiving coils R1 or R2 are substantially aligned with each other or are in close proximity to each other, thus optimizing charging efficiency.

Since the side supports 211, the bottom support 213, and the first and second gears 212 and 214 are connected to each other, a restoring force applied to any one of a side support 211, the bottom support 213 and the first and second gears 212 and 214 by an elastic coupling to the housing 210 will provide a common restoring force for all those components. Thus, an elastic member 211c may be provided between each side support 211 and the housing 210. Alternatively or in addition, an elastic member 213c may be provided between the bottom support 213 and the housing 210. Meanwhile, since the side supports 211 and the bottom support 213 are moved in a state in which they are interlocked with each other, any one of the elastic member 211c and 213c, or all, may be provided.

FIGS. 8A and 8B show that a wireless charger 200 according to this second example may be flexibly used depending on the sizes of the portable terminals to be charged. FIG. 8A illustrates a case in which the first portable terminal MP1 having a relatively small size is inserted into the wireless charger 200. It can be seen from FIG. 8A that movements of the side supports 211 and the bottom support 213 are relatively small (M1). FIG. 8B illustrates a case in which a second portable terminal MP2 having a relatively large size is inserted into the wireless charger 200. It can be seen from FIG. 8B that movements of the side supports 211 and the bottom support 213 are relatively large (M2). Since movements of the side supports 211 and the bottom support 213 are interlocked with each other, it can be seen in either case (MP1, MP2) that the center $C_T$ of the transmitting coil $T_X$ (220) and the center $C_R$ of the receiving coil $R_X$, which is located at the center of the portable terminal, are substantially aligned with each other or are in close proximity to each other.

Figure 9:
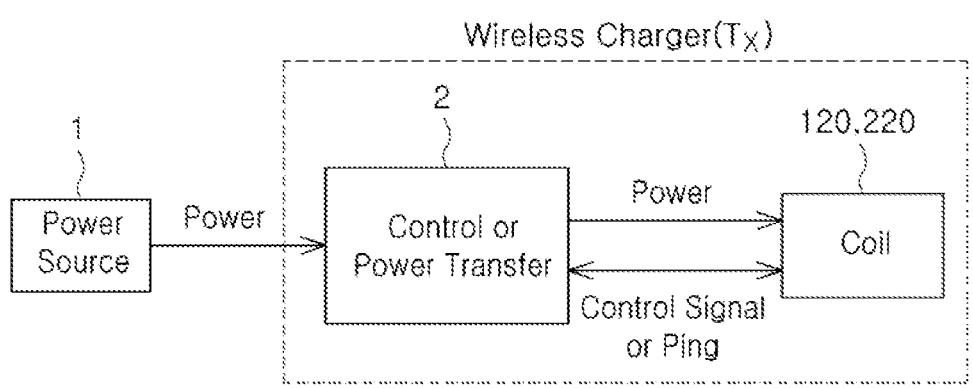
FIGS. 9 and 10 are schematic illustrations of a power transfer principle for the wireless charger.
Figure 10:
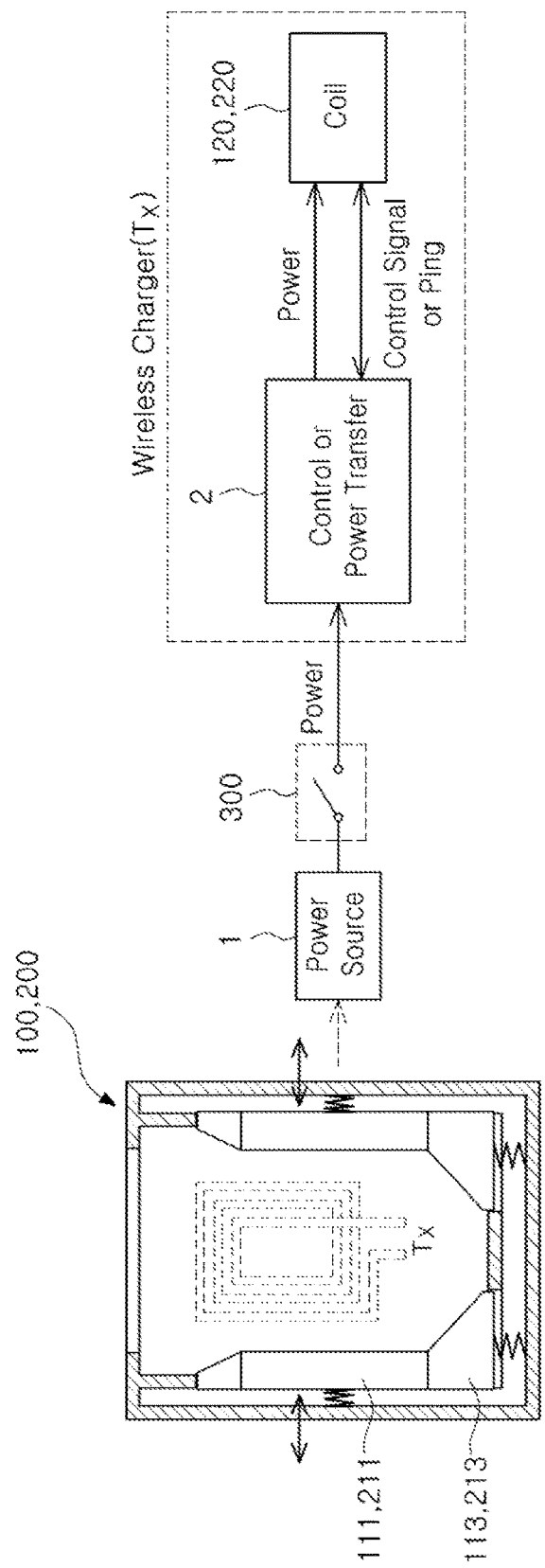

FIGS. 9 and 10 illustrate a power transfer principle of a wireless charger that contemplates use of the charger with portable terminal MP1 or MP2.

FIG. 9 shows how power is transferred to the portable terminals from the wireless chargers 100 and 200, but without an energy-conserving arrangement. For instance, the power may be supplied from a power source 1 and be transferred to the transmitting coils 120 and 220 by control of a control unit 2 (a concept including a power transfer), and the transmitting coils 120 and 220 may receive the power through a receiving coil 23 of the portable terminal. In this case, the control unit 2 is continually supplied with the power from the power source 1 in order for the transmitting coils 120 and 220 to sense the receiving part of the portable terminal, for instance, the receiving coil 23 may consume a predetermined amount of power, even in a case in which the portable terminal is not being charged. This is power which is unnecessarily wasted while the portable terminal is not being charged.

FIG. 10 shows an example of an energy-conserving power transfer arrangement used for the wireless chargers 100 and 200 and other examples according to this disclosure. By providing a switch 300 between the power source 1 and the control unit 2, the power will not be transferred to the control unit 2 from the power source 1 when the portable terminal is not in a charging state. This is accomplished, for example, in the wireless chargers 100 and 200, by mechanically linking movement of any one of the side supports 111, 211 and the bottom support (portions) 113, 213 to the switch 300. Various examples of implementing this linkage to a switch 300 are described below with reference to FIGS. 11 through 19.

Figure 11:
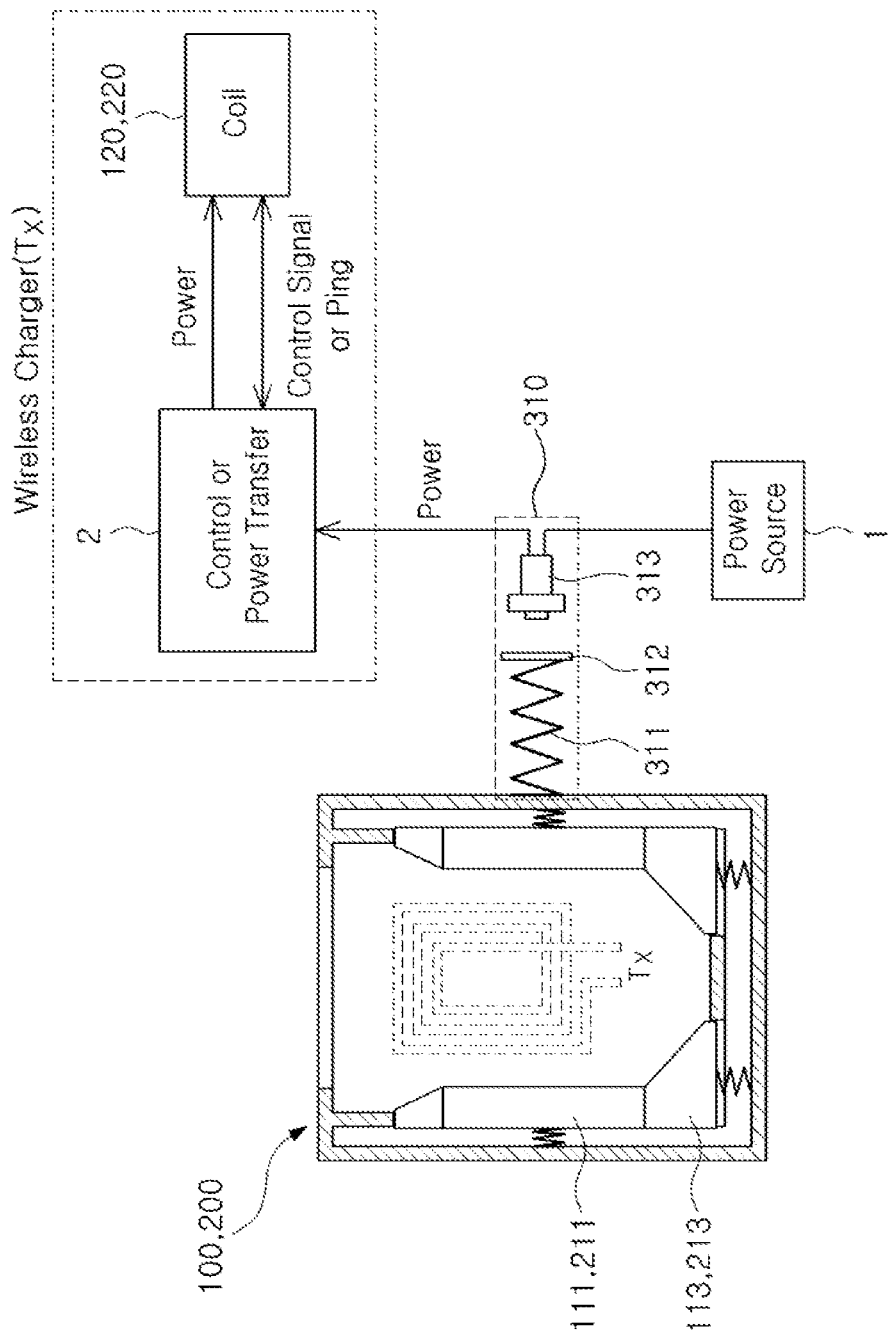
FIGS. 11 through 19 are schematic illustrations of various arrangements for minimizing standby power consumption of the wireless charger.

Referring to FIG. 11, a switch 310 according to an example may have a structure in which a tact switch 313 is provided between the power source 1 and the control unit 2, and the tact switch 313 may be compressed to be operated according to the extension of a side support 111 or 211 or bottom support (portion) 113 or 213. Thus, a spring 311 providing an elastic force may be provided between the either of the side supports 111 and 211, or the bottom support (portion) 113 and 213, and the tact switch 313, and a metal plate 312 may be further provided to a portion at which the spring 311 is in contact with the tact switch 313 in order to improve connection performance.

Figure 12:
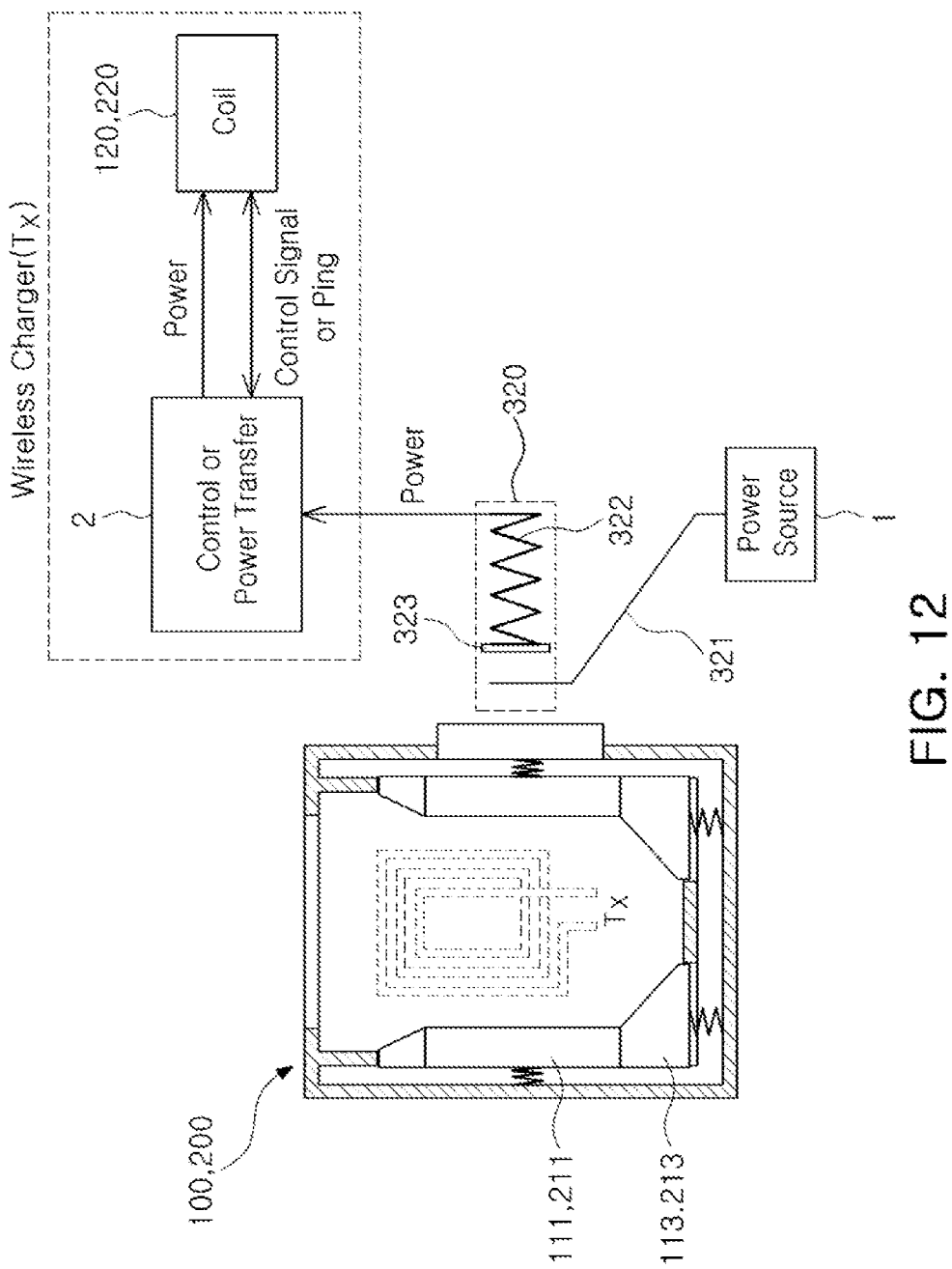

Referring to FIG. 12, a switch 320 according to another example may disconnect a supply line between the power source 1 and the control unit 2, and elastic coupling structures may be formed at the respective end portions of the disconnected supply line. In addition, the switch 320 may be implemented so that the elastic members may be compressed by extension of one of the side supports 111 and 211 or the bottom support (portions) 113 and 213 connected to each other. For instance, the switch 320 may be implemented so that an elastic body 322 having a coil spring structure may be mounted on one end of the disconnected supply line connected to the power source 1 or the control unit 2, and an elastic body 321 having an elastic piece shape may be mounted on the other end thereof; and the elastic body 322 having the coil spring structure and the elastic body 321 having the elastic piece shape may be in contact with each other while the elastic body 322 having the coil spring structure and the elastic body 321 having the elastic piece shape are pushed according to the extension of a side support 111 and 211 or bottom support (portion) 113 and 213. In addition, an end portion of the elastic body 322 having the coil spring structure may be provided with the metal plate 323 to improve connection performance.

Figure 13:
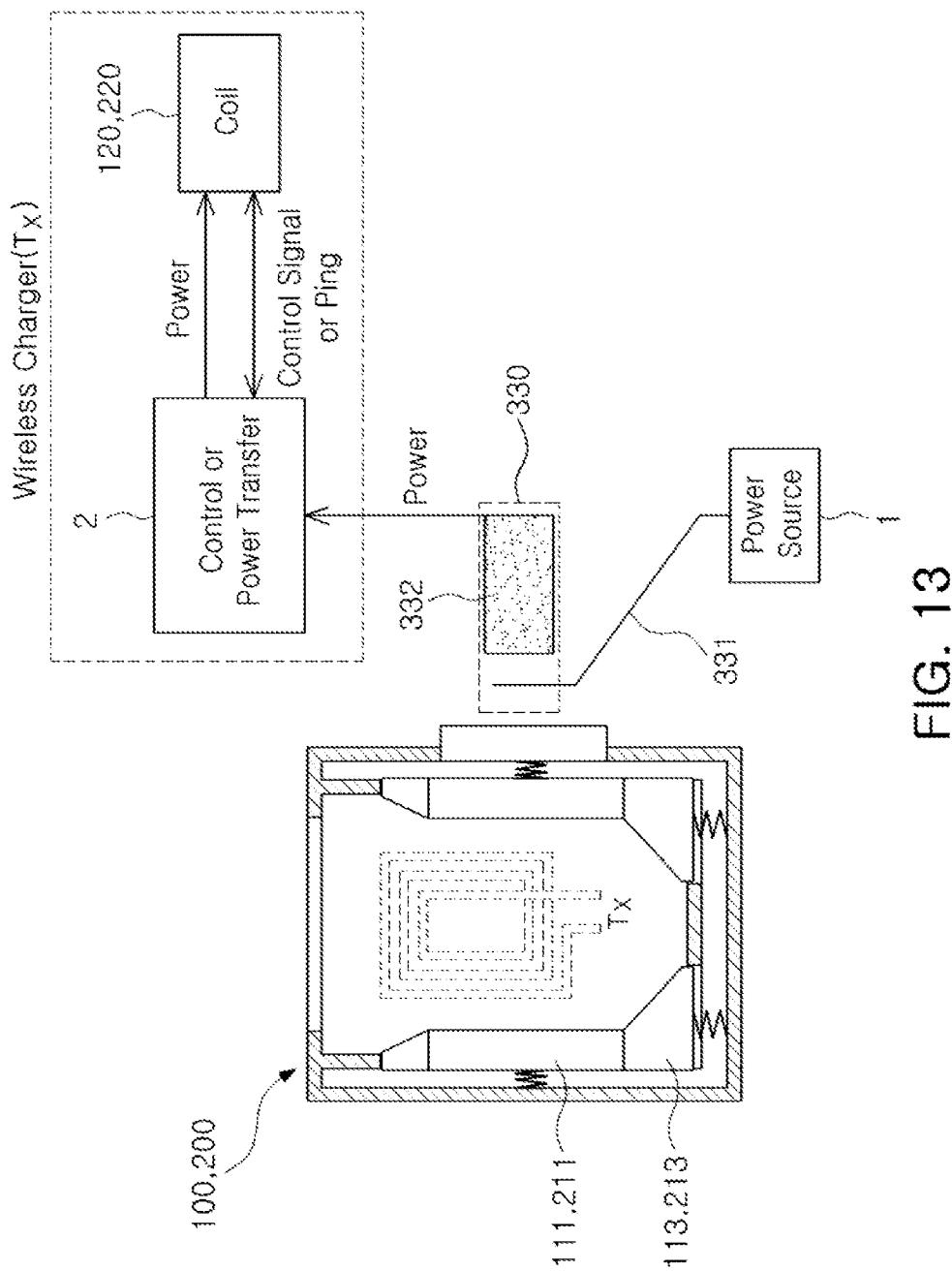

Referring to FIG. 13, a switch 330 according to another example may disconnect a supply line between the power source 1 and the control unit 2, and elastic coupling structures may be formed at the respective end portions of the disconnected supply line. In addition, the switch 330 may be implemented so that the elastic members may be compressed by extension of the side support 111 and 211 or the bottom support (portion) 113 and 213 connected to each other. Since the present example has a shape in which the elastic body 322 having the coil spring structure in the example of FIG. 12 is changed to a conductor sponge 332, a detailed description thereof will be omitted.

Figure 14:
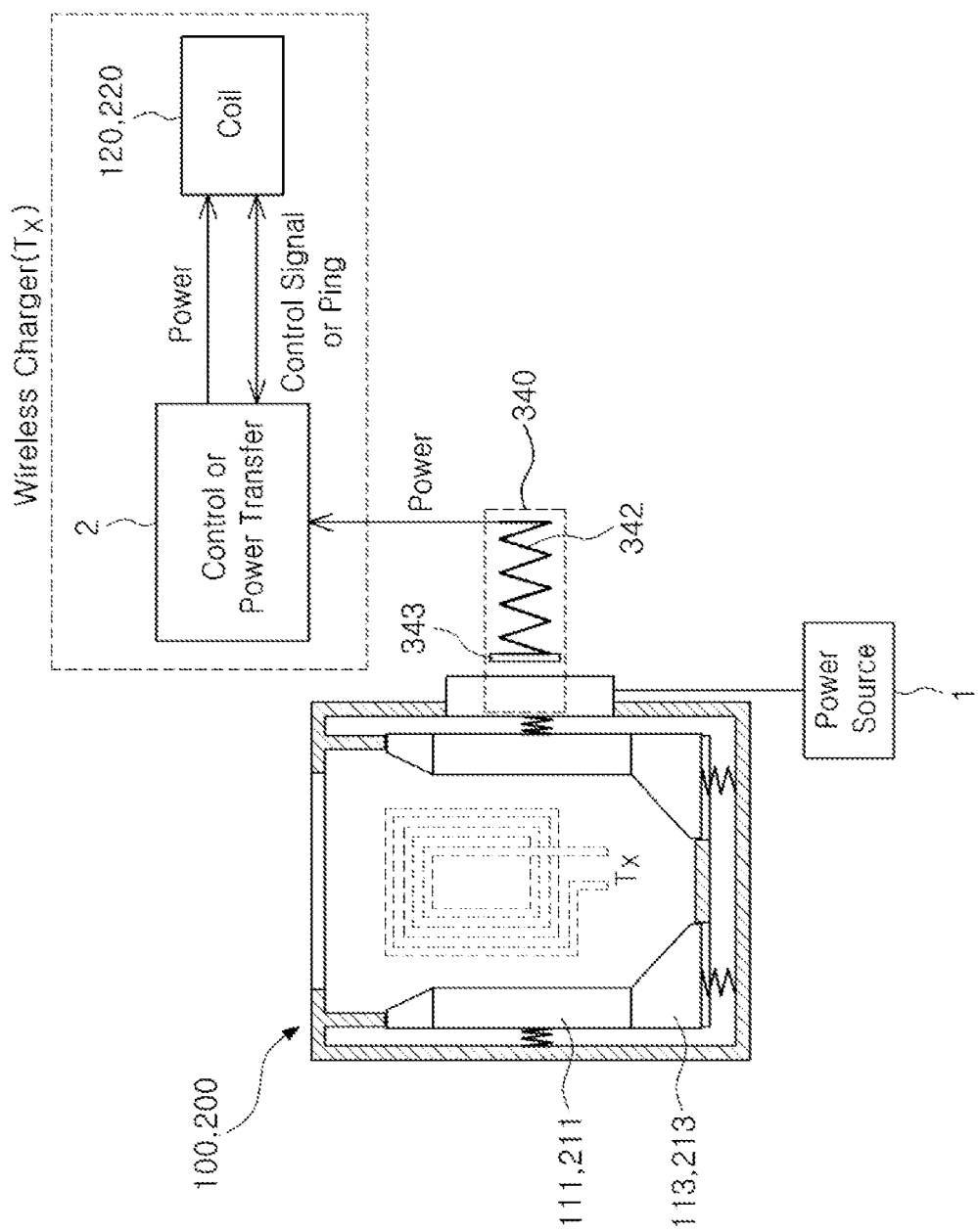

Referring to FIG. 14, a switch 340 according to yet another example may disconnect a supply line between the power source 1 and the control unit 2, and elastic coupling structures may be formed at the respective end portions of the disconnected supply line. In addition, the switch 340 may be implemented so that the elastic members may be compressed according to the extension of either a side support 111 and 211 or a bottom support (portion) 113 and 213 connected to each other. The present example is basically the same implementation scheme as that of FIG. 12, but the supply line connected to the power source 1 may be connected to the side support 111 and 211 or the bottom support (portion) 113 and 213, and the side support 111 and 211 or the bottom support (portion) 113 and 213 may be directly in contact with the supply line connected to the control unit 2. Of course, the side support 111 and 211 or the bottom support (portion) 113 and 213 connected to the supply line may be formed in a structure in which power may be transferred by a wire or the like therein.

In addition, an end portion of the supply line connected to the control unit 2 may be provided with an elastic body 342 having a coil spring structure or an elastic body having an elastic piece shape (not illustrated) in order to improve contact performance, and an end portion of the elastic body 342 having the coil spring structure or the elastic body having the elastic piece shape may be provided with an elastic plate 343.

Figure 15:
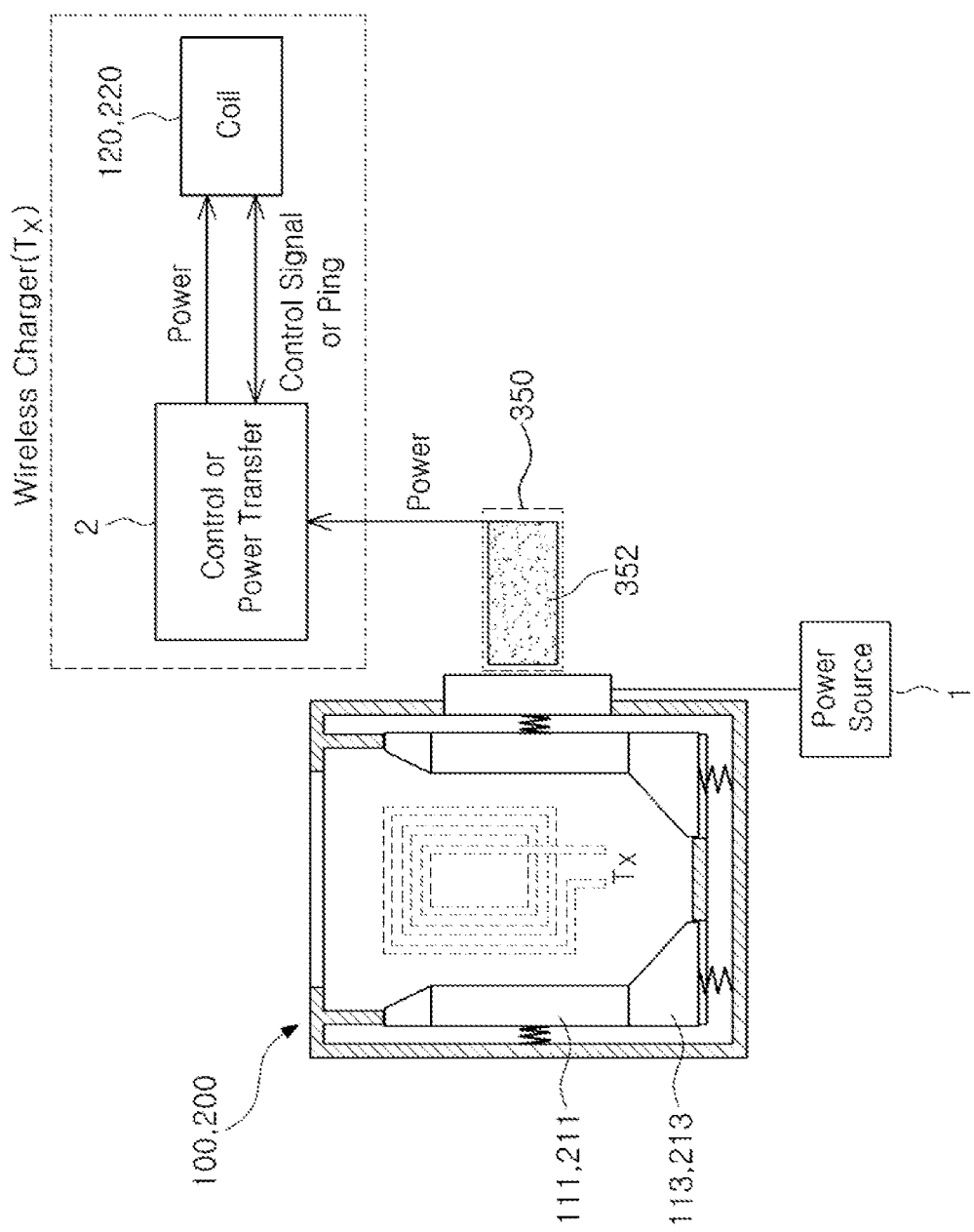

Referring to FIG. 15, a switch 350 according to still another example may disconnect a supply line between the power source 1 and the control unit 2, and elastic coupling structures may be formed at the respective end portions of the disconnected supply line. In addition, the switch 350 may be implemented so that the elastic members may be compressed according to the extension of the side support 111 and 211 or the bottom support (portion) 113 and 213 connected to each other. Since the present example has a shape in which the elastic body 342 having the coil spring structure in the exemplary embodiment of FIG. 14 is changed to a conductor sponge 352, a detailed description thereof will be omitted.

Figure 16:
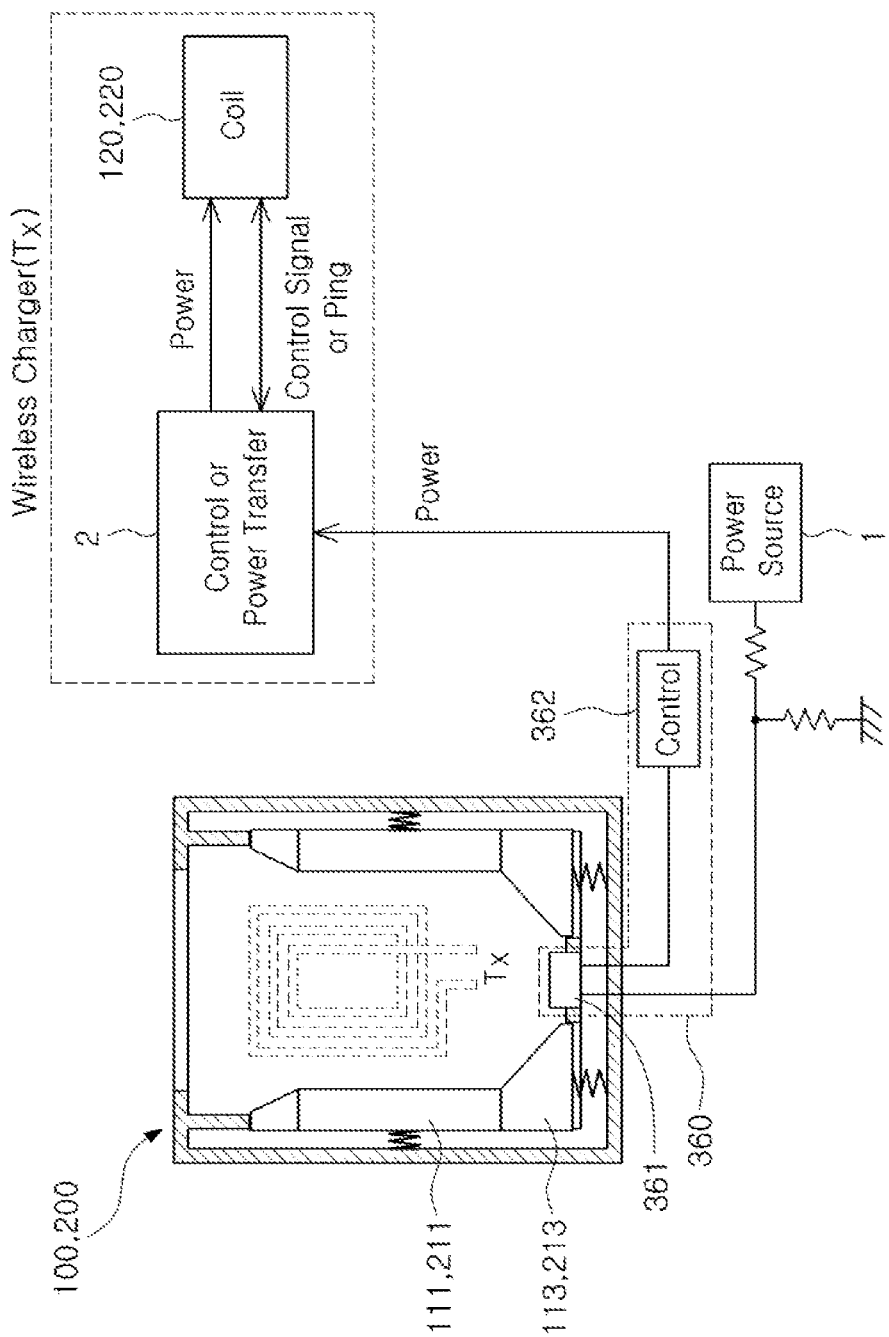

Referring to FIG. 16, a switch 350 according to yet another example may disconnect a supply line between the power source 1 and the control unit 2, and a separate controller 362 may be provided between the disconnected supply lines. In addition, the wireless chargers 100 and 200 may include a proximity sensor 361 such as an ultrasonic sensor, a capacitive sensor, or the like capable of sensing an approach of a portable terminal in a case in which the portable terminal is inserted into the wireless chargers 100 and 200, such that the power may be transferred or disconnected through the supply line by a manipulation of the controller 362 according to the sensing of the approach of the portable terminal.

Figure 17:
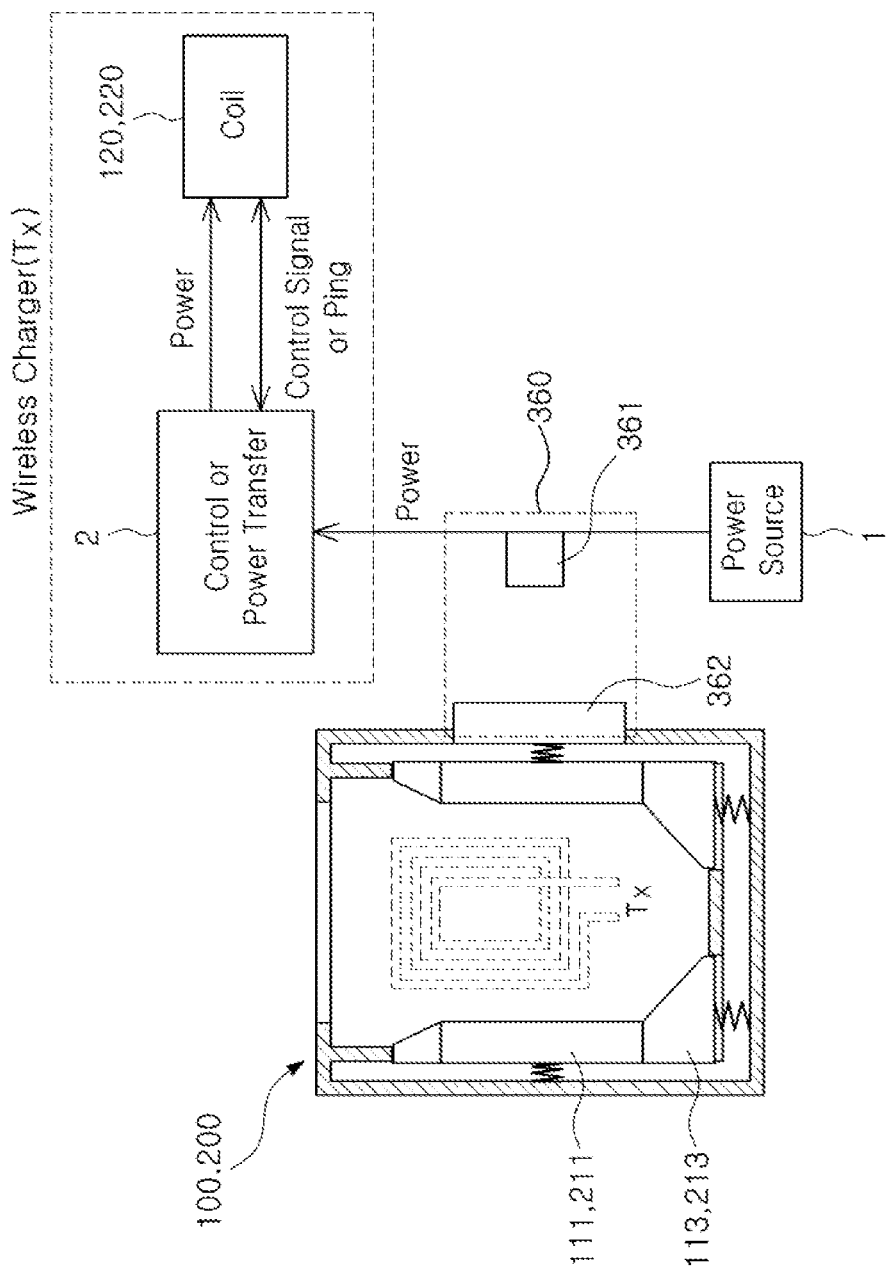

Referring to FIG. 17, a switch 360 according to another example may disconnect a supply line between the power source 1 and the control unit 2, and a controller 361 including a separate hall sensor may be provided between the disconnected supply lines. In addition, a magnet 362 may be provided to one end of a side support 111 and 211 or the bottom support (portion) 113 and 213 so as to come into proximity with the controller 361 according to the extension of the side support 111 and 211 or the bottom support (portion) 113 and 213. The hall sensor senses the approach of the magnet 362, such that it may be sensed that the portable terminal is inserted into the wireless chargers.

Figure 18:
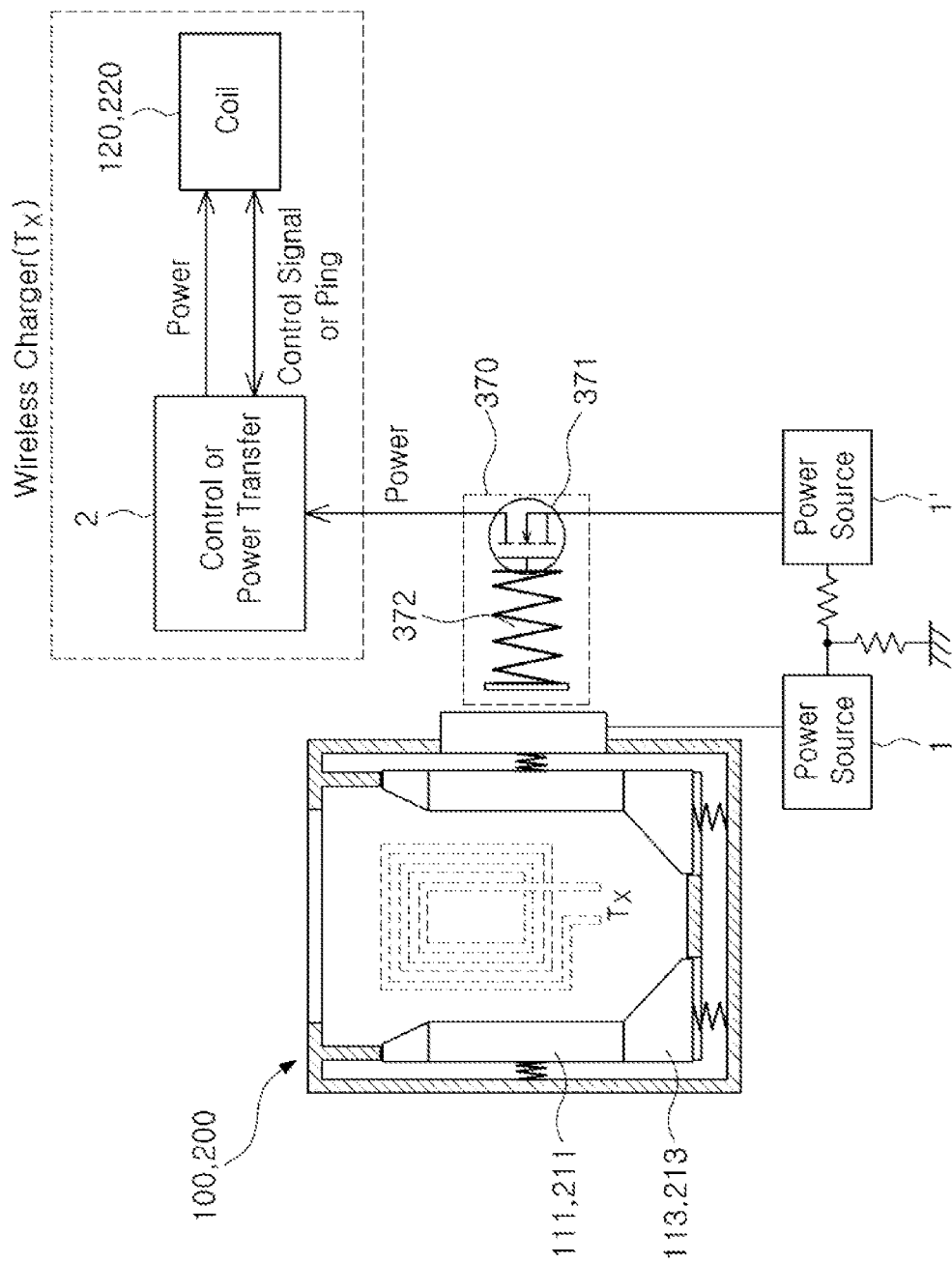

Referring to FIG. 18, a structure of a switch 370 capable of receiving the power by a plurality of power sources and 1' is illustrated. A transistor switch 371 may be installed between the power sources 1 and 1' and the control unit 2 (power input terminal) of a wireless charger circuit, and a spring 372 may be connected to a base terminal (in a case of BJT) or a gate terminal (in a case of FET). In a case in which the portable terminal is inserted into the wireless charger and compresses the side supports 111 and 211 (and, therefore, the bottom support (portion) 113 and 213, a voltage may be applied to the base terminal or the gate terminal, such that the transistor switch is turned on. In this case, the power sources and the wireless charger circuit may be connected. In a case in which the side supports 111 and 211 and the bottom support (portion) 113 and 213 are not compressed, the power sources and the wireless charger circuit may be disconnected from each other.

Figure 19:
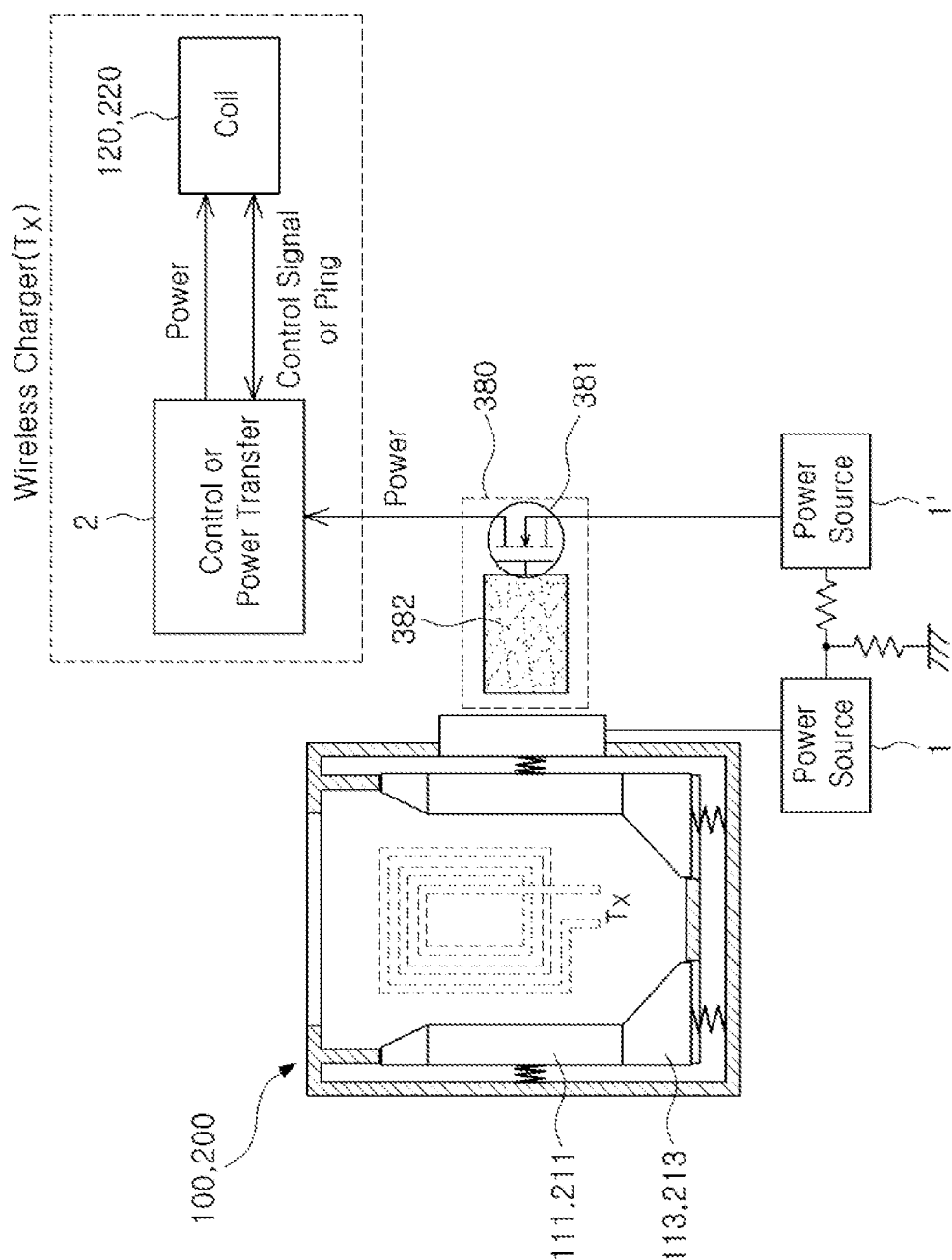

Referring to FIG. 19, a structure of a switch 380 capable of receiving the power by a plurality of power sources 1 and 1' is illustrated. A transistor switch 381 may be installed between the power sources 1 and 1' and the control unit 2 (power input terminal) of a wireless charger circuit, and a conductor sponge 382 may be connected to a base terminal (in a case of BJT) or a gate terminal (in a case of FET). In a case in which the portable terminal is inserted into the wireless charger and compresses the side supports 111 and 211 and the bottom support (portion) 113 and 213, a voltage may be applied to the base terminal or the gate terminal, such that the transistor switch is turned on. In this case, the power sources and the wireless charger circuit may be connected. In a case in which the side supports 111 and 211 and the bottom support (portion) 113 and 213 are not compressed, the power sources and the wireless charger circuit may be disconnected from each other.

While this disclosure includes specific examples, it will be apparent to persons skilled in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless charger comprising:
a housing comprising an insertion hole through which a portable terminal is insertable into the housing;
a transmitting coil configured in the housing;
a pair of laterally spaced side supports in the housing; and
a bottom support in the housing disposed to move lengthwise of the housing and support a portion of the portable terminal when inserted in the housing,
wherein the side supports are mechanically linked to the bottom support such that movement of the bottom support is coordinated with separate movement of the side supports, and
wherein a side support of the pair of side supports is configured to laterally move within the housing in response to the portable terminal being inserted into the housing and to an extent for aligning a receiving coil of the portable terminal with the transmitting coil.

2. The wireless charger of claim 1, wherein an upper end of each side support is inclined.

3. The wireless charger of claim 1, further comprising:
an elastic member interposed between each side support and the housing.

4. The wireless charger of claim 1, further comprising:
an elastic member interposed between the bottom support and the housing.

5. A wireless charger comprising:
a housing comprising an insertion hole through which a portable terminal is insertable into the housing;
a transmitting coil in the housing disposed to face a receiving coil of a portable terminal when the portable terminal is inserted into the housing;
a pair of laterally spaced side supports in the housing disposed to move laterally toward and away from each other on opposite sides of an inserted portable terminal; and
a bottom support in the housing disposed to move lengthwise of the housing and support a portion of the bottom of the inserted portable terminal,
wherein the side supports are mechanically linked to the bottom support such that movement of the bottom support is coordinated with movement of the side supports,
wherein the bottom support comprises two separate bottom support portions and each side support is connected to a respective bottom support portion to form two support assemblies,
wherein movement of each support assembly is guided by a guide protrusion slidably engaged with a guide rail inclined with respect to the side supports and the bottom support, and
wherein each support assembly carries one of the guide protrusion and the guide rail, and the housing carries the other of the guide protrusion and the guide rail.

6. The wireless charger of claim 5, wherein the gradient of the guide rail substantially corresponds to an aspect ratio of the insertable portable terminal.

7. The wireless charger of claim 5, wherein each support assembly is generally L-shaped.

8. The wireless charger of claim 1, wherein the side supports and the bottom support are operatively connected to each other by a guide rail and a mating guide protrusion slidable along the guide rail,
wherein the guide rail is inclined with respect to the movement directions of the side supports and the bottom support and is carried by one of a side support and the bottom support, and
the guide protrusion is fixed to the housing.

9. The wireless charger of claim 1, wherein a power transfer unit including gears coordinates movement of the bottom support and at least one of the side supports.

10. The wireless charger of claim 9, wherein the power transfer unit comprises a first gear having a saw-toothed wheel engaged with teeth on the side support and rotated by lateral movement of the side support, and a second gear having a saw-toothed wheel engaged with the first gear and with the teeth on the bottom support to move the bottom support lengthwise of the housing according to lateral movement of the side support.

11. The wireless charger of claim 1, further comprising:
a switch controlling delivery of power to the transmitting coil from a power source,
wherein the switch is operated by movement of the bottom support or movement of a side support.

12. The wireless charger of claim 11, wherein the switch comprises a tact switch.

13. The wireless charger of claim 11, wherein the switch comprises an elastic switch operated by compressing an elastic member by movement of a spring clip.

14. The wireless charger of claim 11, wherein the switch is an elastic switch operated when a side support or the bottom support is moved to be in contact with an elastic member while compressing the elastic member.

15. The wireless charger of claim 11, wherein the housing comprises a proximity sensor which detects the approach of a portable terminal to be inserted into the housing, such that whether or not the power is supplied is adjusted by manipulation of a controller controlling the proximity sensor.

16. The wireless charger of claim 11, wherein a side support or the bottom support carries a magnet and the switch comprises a hall sensor which detects movements of the support that carries the magnet, such that whether or not power is supplied is adjusted by a manipulation of a controller controlling the hall sensor.

17. The wireless charger of claim 1, wherein the side support of the pair of side supports is configured to reflexively laterally move within the housing in response to the portable terminal being inserted into the housing and to the extent for aligning the receiving coil of the portable terminal with the transmitting coil.

18. The wireless charger of claim 1, wherein the bottom support comprises two separate bottom support portions and each side support is connected to a respective bottom support portion to form two support assemblies,
wherein movement of each support assembly is guided by a guide protrusion slidably engaged with a guide rail inclined with respect to the side supports and the bottom support, and
wherein each support assembly carries one of the guide protrusion and the guide rail, and the housing carries the other of the guide protrusion and the guide rail.

19. The wireless charger of claim 18, wherein the gradient of the guide rail substantially corresponds to an aspect ratio of the insertable portable terminal.

20. The wireless charger of claim 18, wherein each support assembly is generally L-shaped.

21. A wireless charger comprising:
a housing comprising an opening through which a portable terminal is insertable into the housing;
a transmitting coil configured in the housing;
a support disposed in the housing and configured to move, in response to the portable terminal being inserted into the housing, toward either one or both of a side wall of the housing and a bottom wall of the housing to cause a facing of a receiving coil of the portable terminal with the transmitting coil; and
a guide protrusion configured to slide along a guide rail in response to the movement and extending from either one of the support and another side wall of the housing.

22. A wireless charger comprising:
a housing comprising an opening through which a portable terminal is insertable into the housing;
a side support disposed in the housing and configured to move toward a side wall of the housing in response to the portable terminal being inserted into the housing;
a first gear configured to rotate toward the side wall in response to a movement of the side support;
a second gear configured to rotate in response to a rotation of the first gear; and
a bottom support disposed in the housing and configured to move toward a bottom wall of the housing in response to a rotation of the second gear,
wherein the movement of the side support and/or the movement of the bottom support are configured to cause a facing of a receiving coil of the portable terminal with a transmitting coil.

23. The wireless charger of claim 22, further comprising the transmitting coil in the housing.

24. A wireless charger comprising:
a housing comprising an opening through which a portable terminal is insertable into the housing;
a side support disposed in the housing and configured to move toward a side wall of the housing in response to the portable terminal being inserted into the housing; and
a bottom support disposed in the housing and configured to move toward a bottom wall of the housing in response to a movement of the side support,
wherein the movement of the side support and/or the movement of the bottom support are configured to cause a facing of a receiving coil of the portable terminal with a transmitting coil.

25. The wireless charger of claim 24, further comprising the transmitting coil in the housing.

* * * * *